Feb. 20, 1934. N. J. DU DONJON 1,948,205
MOLDING MACHINE
Filed Aug. 4, 1932 3 Sheets-Sheet 2

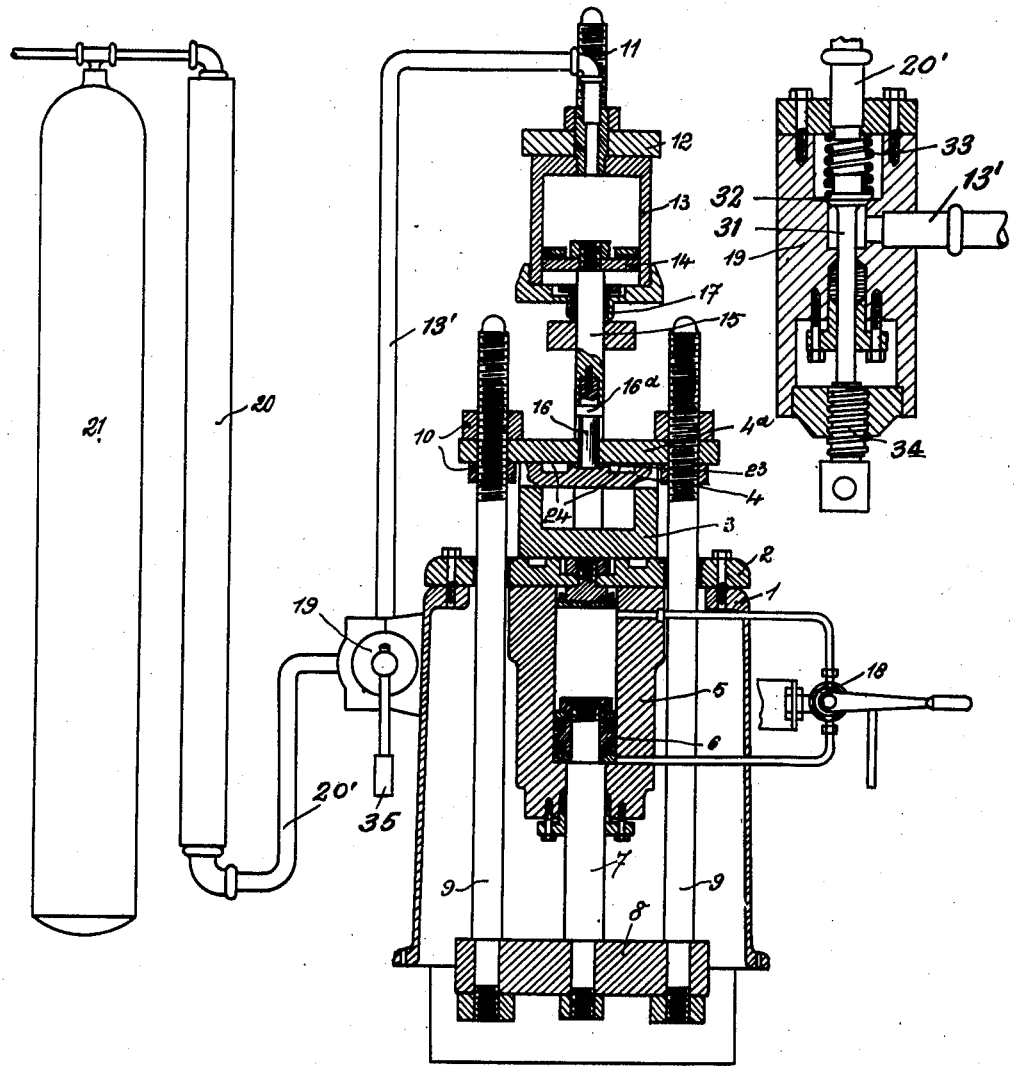

Inventor
Norbert Jacquemont du Donjon
By Sommers & Yow

Feb. 20, 1934.  N. J. DU DONJON  1,948,205
MOLDING MACHINE
Filed Aug. 4, 1932   3 Sheets-Sheet 3
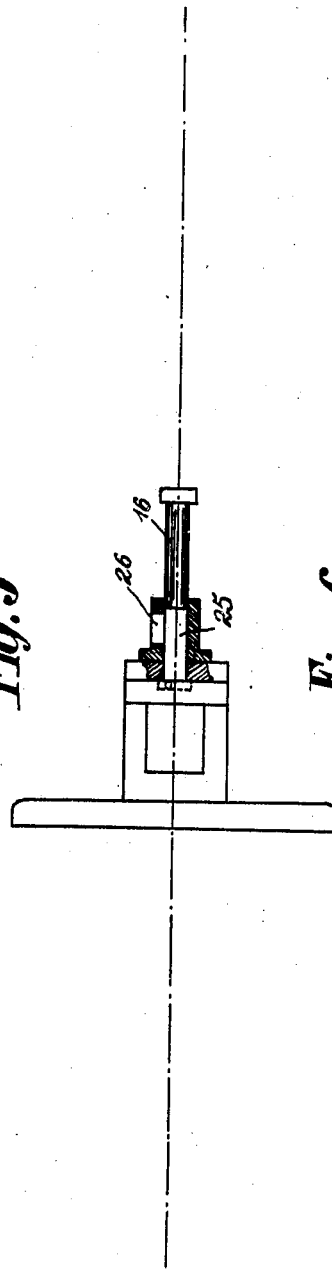
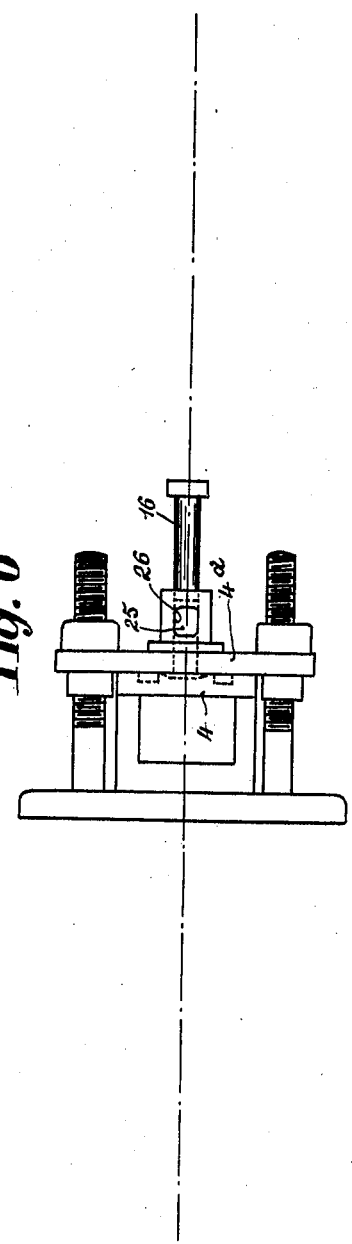
Inventor
Norbert Jacquemont du Donjon
By Sommers & Young
Attys.

UNITED STATES PATENT OFFICE 1,948,205

MOLDING MACHINE

Norbert Jacquemont du Donjon, Paris, France

Application August 4, 1932. Serial No. 627,485

4 Claims. (Cl. 22—68)

This invention relates to the construction of a molding machine designed to be utilized more particularly for molding under pressure.

In existing plants constructed in view of the molding of metals under pressure in general and more particularly of metals having a high melting point two separate apparatus are generally used: 1st an apparatus controlling the working of the two elements of the mold, that is which allows of drawing them apart and bringing them together for closing the mold and of insuring a strong clamping capable of preventing the opening of the mold under the stress of the introduced metal; 2nd, an apparatus for introducing metal under pressure into the mold, and the driving of which may be effected by water, by air or by any suitable mechanism.

It will be easily understood that the motive power provided by the first apparatus to keep the mold closed while the metal is being forced in is much greater than that which is necessary to simply displace the movable element of the mold. Consequently an important portion of the power from the first apparatus becomes available during the displacement of said element.

It is necessary on the other hand to expend a certain quantity of power produced by the second apparatus to effect the injection of the metal and this expense is so far real in existing machines that it comes in addition to that of the first apparatus.

The present invention has for its object to do away with the totalization of these two expenses. It consists in constructing the molding plant so as to raise upon the power produced by the first apparatus during the translation of the movable mold element the necessary power for forcing the metal into the mold.

In a remarkably rational mode of execution the present invention is characterized in that the movable mold element is arranged so as to operate during its upward stroke that is during the mold opening stroke upon the movable system of the injector in such a manner that said movable system being returned to its first position brings the pressure back to its original value in the second apparatus thus recuperating the power given out by this apparatus during the injection stroke.

Another characteristic of the invention consists in that a check valve is placed in the motive power piping of the second apparatus so as to automatically separate the latter from the source of pressure which operates it when the injection system has been returned to its first position by the movable mold element, a friction device being provided to retain said system in its upper position from the instant of the closing of the valve when the movable element can again descend to close the mold.

In existing molding machines there are two pistons which either move in opposite directions to force the metal in a feeding channel or act so that one of the pistons serves to press the metal and the other to force the remaining metal out of the filling cylinder.

These methods have the drawback that the rest of the metal is ejected separately and must be cut off with shears from the work piece. The existing methods also require very long filling channels. On the other hand the present invention presents this particular feature that a certain amount of play is provided for the raising of the piston by the movable mold element, this owing to the fact that the latter first frees the working portion of the injecting piston.

Another feature of the invention consists in that the metal may be simultaneously pressed by a piston and driven. Owing to this arrangement the shearing operation is no longer necessary and the length of the inlet channel is considerably reduced.

This arrangement has also the advantage that the metal parts which may get in between the injecting piston and its cylinder wall are automatically disengaged before the piston begins its return stroke.

This result is due to the provision of an abutment collar upon the injecting piston which when the movable element closes the mold is separated from said element by an interval equal at least to the depth of the cylinder which is figured by the thickness of said movable element.

In the foregoing supposing the machine to be vertical the terms "raising" and "lowering" have been used but it is evident that the invention may also be applied to horizontal machines in which the mode of operation is the same, it being necessary only to substitute respectively the terms forward and backward movement.

In that case, the movable mold element comprises a chamber for the metal and is provided with metal inlet opening. This chamber may either be stationary or movable. When it is stationary the inlet channel remains open, on the contrary when it is movable the inlet channel opens only when an adjustable preliminary pressure has been reached, this pressure being adjusted for example by means of a spring and of the automatic displacement of the chamber along its longitudinal axis.

The appended drawings show by way of example two modes of execution of an improved pressure molding machine according to the present invention.

Figs. 1 to 4 show a vertical machine.

Fig. 1 is a vertical sectional view showing the mold in its closed position the injecting piston being at the end of its driving stroke.

Fig. 2 is a vertical sectional view of the valve box placed upon the motor piping of the injecting piston driving apparatus.

Fig. 3 represents the movable mold element and the injecting piston at the end of their upward stroke.

Fig. 4 shows the injecting piston at the end of its upward stroke when the movable element has moved back to close the mold.

Fig. 5 is a part sectional elevation of the mold in the case of a horizontal machine.

Fig. 6 is a corresponding plan view.

Fig. 7 is a sectional side elevation of a mold having a feeding sleeve.

Fig. 8 is a similar view to Fig. 7 showing the feeding ram in advanced position.

Figure 3:
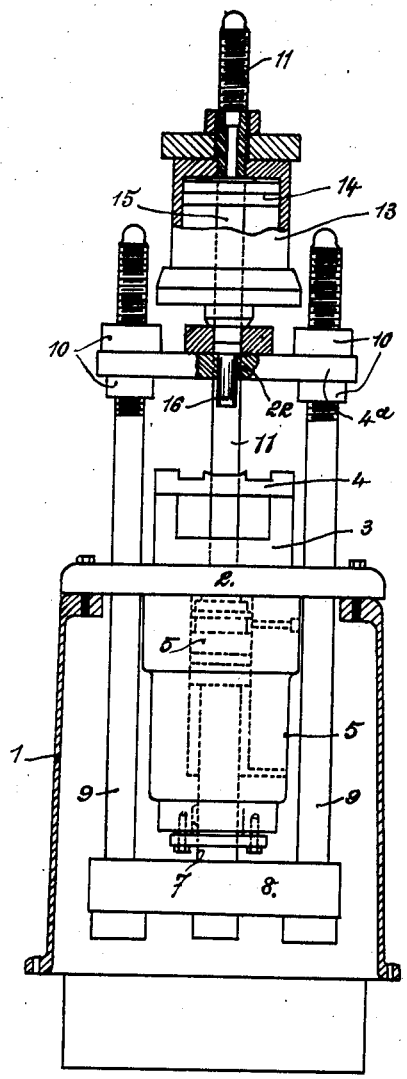
Figure 4:
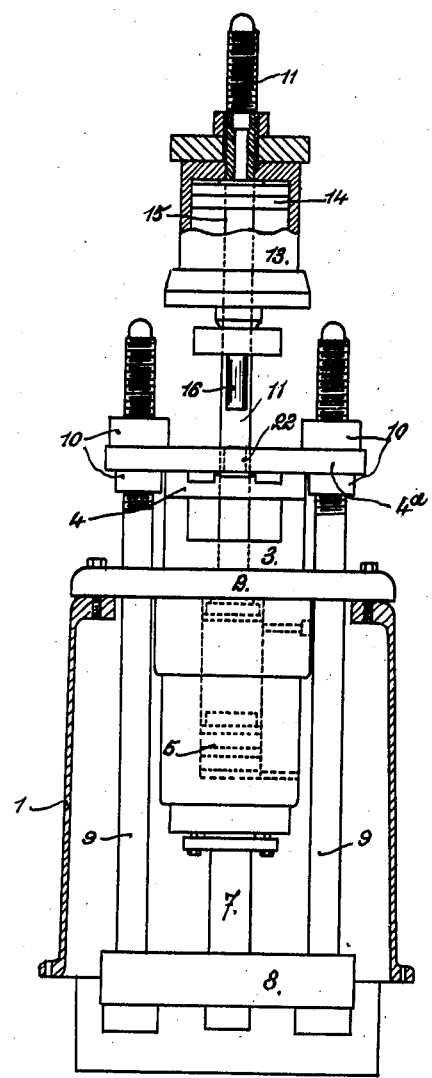

In the drawings, 1 represents the frame which supports a table 2 carrying in the middle a mold composed for example of a carrier 3 and two plates 4, 4ª.

A stationary cylinder 5 in which moves a piston 6 is placed under the table; said piston being provided with leather packings and connected by means of a stem 7 to a brace 8 which connects and actuates two columns 9. The latter driving by means of the nuts 10 the top plate 4ª of the mold which constitutes in that case the head of the press.

A support 12, upon the lower face of which a cylinder 13 is secured, is carried upon two columns 11 screwed in the table 2. A piston 14 provided with leather packings moves in the cylinder 13 and drives by the intermediary of the stem 15 a second smaller piston 16.

The stem 15 passes through a special packing 17 acting as a brake to prevent the unit 16, 15, 14 from falling back under its own weight when it is left to itself at the upper dead center of its stroke.

The piston 16 is provided with an abutment 16ª which when it is at the end of its pressure stroke is separated from the plate 4ª by an interval equal at least to the thickness of said plate in which the cylinder 22 is formed. The arrangement is such when the plate 4ª moves upward and has accomplished a given stroke, it engages a shoulder 16ª provided upon the small piston and returns the unit 16, 15, 14 to its upper dead center.

The operation of the lower press which opens and closes the mold elements is controlled by a delivery device 18 which is fed with oil or water under pressure from a compressor, not shown, and which allows of sending the fluid upon either face of the piston 6.

The piston 14 is controlled in the cylinder 13 by means of the valve 19 which is connected to the cylinder 13 by means of the conduit 13' and is connected to the pressure accumulating receiver 20 by the conduit 20', the receiver in turn being connected with the pneumatic pressure chamber 21.

The valve 19 comprises a housing containing a valve stem 31 and a valve head 32. The valve head 32 is adapted to be forced against the valve seat by means of the spring 33. The valve stem abuts against a screw plug 34 (the stem is not connected to said plug) which may be turned by means of a lever 35. When the plug is screwed into the housing, the valve stem is displaced whereby the valve head is raised from its seat. Upon retracting the screw plug, the spring 33 again presses the valve head against the seat.

Inversely, when the plate 4ª draws the unit 16, 15, 14 upwards, the water contained in the cylinder 13 will be forced through the check valve 19 and back into the piping towards the receiver 20, consequently the pressure at 20 will be brought back to its initial value.

The mode of operation is as follows:

The mold being open, that is the plate 4ª being in its upper position the unit 16, 15, 14 is at its top dead center.

At this moment the delivery device 18 being operated liquid under pressure is directed upon the upper part of the piston 6 which is driven downwards. The plate 4ª acting with the piston 6 engages the plate 4. The parts 4 and 4ª comprise the mold. The injection unit 16, 15, 14 remaining at its upper dead center on the one hand because the valve 19 is closed and on the other hand because the brake prevents it from moving down by its own weight.

The metal to be molded is introduced in the form of a heated or liquid mass in the recess 22 of the top plate 4ª as above indicated.

When acting upon the lever of the check valve 19 the valve head is lifted and the water contained in the air-water cylinder 20 flows into cylinder 13. The unit 16, 15, 14 descends and the small piston 16 entering the recess 22 drives the metal in the prints 24 in the mold by means of the connecting passages 23. The lever 35 of the valve 19 is then returned to its original position whereupon the valve head 32 is forced back upon the valve seat by means of the spring 33. Thereafter, when the delivery device 18 is operated the pressure fluid flows under the lower face of piston 6.

At that moment the top plate 4ª of the mold begins its upward stroke. The small piston 16 which passes through this plate will be drawn in its movement only when the plate 4ª engages the shoulder 16ª, with the result that the metal particles which may have crept in between the piston 16 and the wall of the cylinder 22 in which it has just acted upon the metal, are released at the bottom.

As the plate 4ª continues its upward movement it returns the unit 16, 15, 14 to its dead center and forces the water contained in the cylinder 13 back into the receiver 20 the check valve 19 being forced open. The pressure in the receiver 20 is thus brought back to its initial value so that the amount of power given out for the injection of the metal is annulled.

The upward translation is limited by the abutting of the piston 6 against the bottom of cylinder 5.

All movement being suspended the molded work pieces may be taken out.

The following operations are executed in the same order as above described.

In the case of a horizontal machine the mode of arrangement and operation are generally similar, the downward and upward strokes becoming forward and backward movements. In that case however, to the movable mold element is added a chamber 25 to receive the metal charge as shown in Figs. 5 and 6. It is provided at the top with a metal inlet opening 26 of any suitable shape. Consequently the injecting piston 16 forms one of the walls of said chamber.

The metal which is to fill the lower portion only of the chamber 25 and not the whole of it, is drawn along by the translation of the piston and at the moment when the pressing takes place the opening 26 is obturated by the piston.

It will be evident that the length of the piston and the position of the abutment 16a are adapted to this modification of the movable mold element.

What I claim and desire to secure by Letters Patent of the United States is:

1. In a pressure molding machine, a mold having at least two sections, one of said mold sections rigidly mounted on a stationary support, the other section connected to a movable hydraulically operated ram, an independently movable member for injecting said material to be molded, said member connected to a fluid operated piston, a check valve for controlling the pressure in the cylinder of the fluid operated piston, and means fixed to said movable mold section for returning the fluid operated piston into its original position when the mold is open and thereby displacing the fluid from said cylinder through said check valve.

2. In a pressure molding machine, a mold having at least two sections, means for fixedly mounting one of said sections, hydraulic means for moving the other section, single acting means for forcibly injecting the material to be molded into said mold, and means operated by said hydraulic means for returning said single acting means to its original operating position.

3. In a pressure molding machine, a mold having a movable section, hydraulic means for moving said section, single acting means for forcibly injecting the material to be molded into said mold, means operated by said hydraulic means for returning said single acting means to its original operating position, and braking means for retaining said single acting means in said operating position.

4. In a pressure molding machine, a mold having a movable section, hydraulic means for moving said section, single acting piston means for forcibly injecting the material to be molded, a longitudinally movable cylinder, connected to said mold section, for containing the material to be molded, said cylinder having inlet openings for the material and the piston respectively, and means operated by said hydraulic means for returning said single acting piston to its original operating position.

NORBERT JACQUEMONT du DONJON.